(12) United States Patent
Bohling et al.

(10) Patent No.: US 10,723,838 B2
(45) Date of Patent: Jul. 28, 2020

(54) PROCESS FOR PREPARING AN AQUEOUS DISPERSION OF POLYMERIC MICROSPHERES

(71) Applicant: Rohm and Haas Company, Collegeville, PA (US)

(72) Inventors: James C. Bohling, Lansdale, PA (US); Ibrahim Eryazici, Limerick, PA (US); Philip R. Harsh, Gilbertsville, PA (US); Partha S. Majumdar, Harleysville, PA (US); Edwin Nungesser, Horsham, PA (US)

(73) Assignee: Rohm and Haas Company, Collegeville, PA (US)

( * ) Notice: Subject to any disclaimer, the term of this patent is extended or adjusted under 35 U.S.C. 154(b) by 111 days.

(21) Appl. No.: 16/115,738

(22) Filed: Aug. 29, 2018

(65) Prior Publication Data

US 2019/0071540 A1    Mar. 7, 2019

Related U.S. Application Data

(60) Provisional application No. 62/638,993, filed on Mar. 6, 2018, provisional application No. 62/554,086, filed on Sep. 5, 2017.

(51) Int. Cl.
| | | |
|---|---|---|
| *C08G 65/22* | (2006.01) | |
| *C08F 265/06* | (2006.01) | |
| *C08F 285/00* | (2006.01) | |
| *C09D 4/00* | (2006.01) | |
| *C08F 2/26* | (2006.01) | |
| *C08F 4/40* | (2006.01) | |
| *C08F 220/18* | (2006.01) | |
| *C09D 7/65* | (2018.01) | |
| *C09D 7/40* | (2018.01) | |
| *C09D 7/42* | (2018.01) | |
| *C08L 71/02* | (2006.01) | |

(52) U.S. Cl.
CPC ............... *C08G 65/22* (2013.01); *C08F 2/26* (2013.01); *C08F 4/40* (2013.01); *C08F 220/18* (2013.01); *C08F 265/06* (2013.01); *C08F 285/00* (2013.01); *C08L 71/02* (2013.01); *C09D 4/00* (2013.01); *C09D 7/42* (2018.01); *C09D 7/65* (2018.01); *C09D 7/70* (2018.01); *C08F 2438/02* (2013.01); *C08L 2201/50* (2013.01); *C08L 2201/54* (2013.01); *C08L 2312/00* (2013.01)

(58) Field of Classification Search
CPC ..... C08G 65/22; C08L 71/02; C08L 2312/00; C08L 2201/54; C08L 2201/50; C09D 7/70; C09D 7/42; C09D 7/65
See application file for complete search history.

(56) References Cited

U.S. PATENT DOCUMENTS

| | | | |
|---|---|---|---|
| 7,829,626 B2 | 11/2010 | Chiou et al. | |
| 8,686,096 B2 | 4/2014 | Deetz et al. | |
| 2009/0186972 A1* | 7/2009 | Zong | C09D 133/02 524/369 |
| 2017/0058116 A1 | 3/2017 | Ando et al. | |

* cited by examiner

*Primary Examiner* — Shane Fang
(74) *Attorney, Agent, or Firm* — Reid S. Willis

(57) ABSTRACT

The present invention relates to composition comprising an aqueous dispersion of microspheres and a class of a nonionic polyalkylene oxide of a distyryl or tristyryl phenol or an anionic polyalkylene oxide salt of a distyryl or tristyryl phenol and a process for preparing the composition. The microspheres have an average particle size in the range of from 1 µm to 25 µm, as well as a low coefficient of variation and low gel concentration; the composition is useful in coatings applications, especially where a matte finish is desired.

6 Claims, No Drawings

PROCESS FOR PREPARING AN AQUEOUS DISPERSION OF POLYMERIC MICROSPHERES

BACKGROUND OF THE INVENTION

The present invention relates to a process for preparing an aqueous dispersion of polymeric microspheres.

Aqueous dispersions of polymeric microspheres having a particle size in the range of from 1.1 µm to 25 µm are useful in compositions that form coatings with a matte (low gloss) finish, for example, as a clear top coat for leather that is smooth to the touch. The preparation of such dispersions are described in U.S. Pat. No. 7,829,626.

Preparing these aqueous polymeric microspheres with excellent particle size uniformity and a minimum formation of particles in the range of from 20 nm to 500 nm (fines) remains a challenge. The presence of fines above threshold levels results in the formation of unacceptable levels of gel, which requires arduous removal, thereby increasing batch times; in many instances, batches have to be discarded entirely.

US 2017/0058116 (Ando) discloses a method for producing microspheres by suspension polymerization with reported excellent dispersion stability, but requires an extra step of preparing cellulose functionalized small particles, which are adsorbed to the surface of the microspheres to provide such stability. Moreover, Ando's examples all report coefficients of variation in the range of 32% to 50%. It would therefore be advantageous to discover a method that produces monodisperse microspheres with acceptably low production of gel, and that does not require the presence of small particles adsorbed to the surface of the microspheres.

SUMMARY OF THE INVENTION

The present invention addresses a need in the art by providing, in a first aspect, a process comprising the step of contacting, under polymerization conditions and in the presence of a nonionic polyalkylene oxide of a distyryl or tristyryl phenol or an anionic polyalkylene oxide salt of a distyryl or tristyryl phenol, an aqueous dispersion of first microspheres comprising structural units of a first monoethylenically unsaturated nonionic monomer with a first stage monomer comprising from 70 to 100 weight percent of a second monoethylenically unsaturated nonionic monomer, based on the weight of first stage monomer, to grow out the first microspheres to form an aqueous dispersion of second microspheres, wherein the first microspheres have a particle size in the range of from 1 µm to 15 µm and the second microspheres have a particle size in the range of from 1.1 µm and 25 µm.

In a second aspect, the present invention is a composition comprising a) an aqueous dispersion of polymeric microspheres and from 0.01 to 5 weight percent, based on the weight of the microspheres, of a nonionic polyalkylene oxide of a distyryl or tristyryl phenol or an anionic polyalkylene oxide salt of a distyryl or tristyryl phenol;

or b) an aqueous dispersion of polymeric microspheres functionalized with from 0.01 to 5 weight percent, based on the weight of the microspheres, of structural units of a nonionic polyalkylene oxide of a distyryl or tristyryl phenol or an anionic polyalkylene oxide salt of a distyryl or tristyryl phenol;

wherein the polymeric microspheres have a solids content in the range of from 10 to 60 weight percent, based on the weight of the microspheres and water; wherein the polymeric microspheres have a particle size in the range of from 1 µm to 25 µm and a coefficient of variation of less than 25%; and wherein the dispersion comprises less than 1 weight percent gel, based on the weight of the composition.

The process of the present invention provides a way to control microsphere size with a low coefficient of variation and low gel formation.

DETAILED DESCRIPTION OF THE INVENTION

In a first aspect, the present invention is process comprising the step of contacting, under polymerization conditions and in the presence of a nonionic polyalkylene oxide of a distyryl or tristyryl phenol or an anionic polyalkylene oxide salt of a distyryl or tristyryl phenol, an aqueous dispersion of first microspheres comprising structural units of a first monoethylenically unsaturated nonionic monomer with a first stage monomer comprising from 70 to 100 weight percent of a second monoethylenically unsaturated nonionic monomer, based on the weight of first stage monomer, to grow out the first microspheres to form an aqueous dispersion of second microspheres, wherein the first microspheres have a particle size in the range of from 1 µm to 15 µm and the second microspheres have a particle size in the range of from 1.1 µm and 25 µm.

As used herein, the term "structural unit" of the named monomer, refers to the remnant of the monomer after polymerization. For example, a structural unit of methyl methacrylate is illustrated by the following structure:

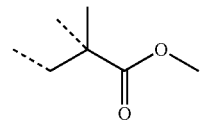

Wherein the dotted lines represent the points of attachment of the structural unit to the microsphere.

Particles size as referenced to microspheres refers to median weight average ($D_{50}$) particle size as measured by Disc Centrifuge Photosedimentometer, as described herein below. Particle size as referenced to latex particles refers the average particle size as measured by a Brookhaven BI 90 Plus Particle Analyzer.

The first microspheres preferably comprise from 90 to 100 weight percent structural units of a first monoethylenically unsaturated nonionic monomer, examples of which include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate. Although it is possible for the first microspheres to include structural units of a carboxylic acid monomer such as methacrylic acid or acrylic acid, it is preferred that the first microspheres comprise a substantial absence of structural units of a carboxylic acid monomer. As used herein, a substantial absence of structural units of a carboxylic acid monomer means less than 5, preferably less than 3, more preferably less than 1, and most preferably less than 0.2 weight percent structural units of a carboxylic acid monomer, based on the weight of the microspheres.

The first microspheres more preferably comprise structural units of acrylates or methacrylates or combinations of acrylates and methacrylates.

The nonionic polyalkylene oxide or anionic polyalkylene oxide salt of a distyryl or tristyryl phenol is represented by the compound of Formula I:

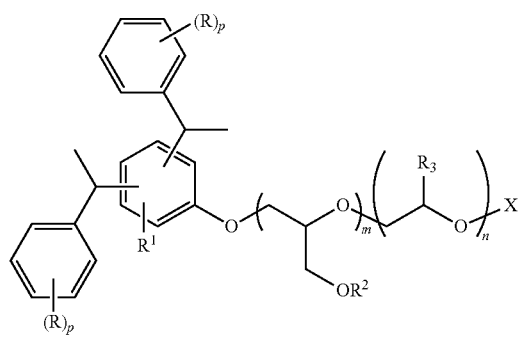

I where each R is independently $C_1$-$C_4$-alkyl; $R^1$ is H, 1-phenethyl-$(R)_p$, $CH_2$—CR=$CH_2$, or CH=$CHCH_3$; each $R^2$ is independently H, allyl, methyl, acrylate, methacrylate, or —$CH_2CHR^3OX$; each $R^3$ is independently H, methyl, or ethyl; m is 0 to 5; n is 6 to 40; p is 0, 1 or 2; and O—X is hydroxyl, methoxyl, a sulfate or a phosphate. Preferably, $R^1$ is 1-phenethyl-$(R)_n$; $R^2$ is preferably H, $CH_3$, or allyl; m is preferably 0, 1, or 2; n is from 10 to 20; p is 0; and O—X is a sulfate or a phosphate. A more preferred polyethylene oxide salt of tristyryl phenol is represented by the compound of Formula II:

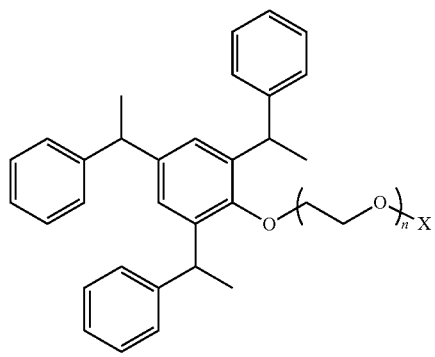

II where X is —$SO_3H$, —$SO_3Y$, —$H_2PO_3$, —$HPO_3Y$, or —$PO_3Y_2$, where Y is $Li^+$, $Na^+$, $K^+$, or $NH_4^+$. An example of a commercially available compound of Formula II is Solvay Soprophor 4D/384 ammonium salt of polyarylphenyl ether sulphate.

Another preferred ethylene oxide salt of distyryl phenol or tristyryl phenol, where m is non-zero, is represented by the compound of Formula III.

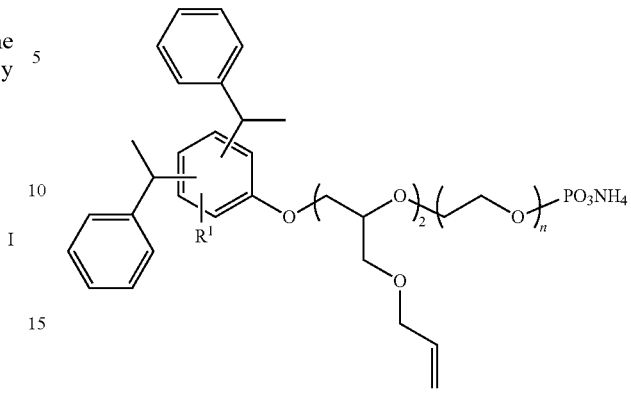

III where n is preferably 12 to 18. A commercial example of the compound of Formula III is E-Sperse RS-1684 reactive surfactant.

Another example of a polyethylene oxide salt of a distyryl phenol is represented by the compound of Formula IV:

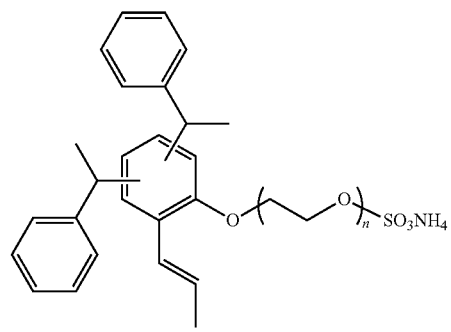

IV

A commercial example of the compound of Formula IV is Hitenol AR-1025 reactive surfactant.

A subclass of compounds of structure I (m=0) can be prepared by reacting distyryl or tristyryl phenol with an alkylene oxide (ethylene oxide, 1,2-propylene oxide, or 1,2-butylene oxide) in the presence of a base such as an alkali metal or alkaline earth metal hydroxide, carbonate, or bicarbonate, or an alkali metal hydride; this intermediate can then be neutralized to the corresponding glycol, methoxylated with a methyl halide, sulfonated with sulfonyl chloride, or phosphorylated with polyphosphoric acid. A compound of Formula III can be prepared in the same manner except that the distyryl or tristyryl phenol is first reacted with an epihalohydrin such as epichlorohydrin in the presence of a base to form the corresponding monoglycidyl ether of the distyryl or tristyryl phenol prior to reaction with the alkylene oxide.

The first microspheres are advantageously prepared from an aqueous dispersion of an oligomeric seed having a weight average molecular weight ($M_w$) in the range of from 800, preferably from 1000 g/mol to 20,000, preferably to 10,000 and most preferably to 5000 g/mol as determined by size exclusion chromatography using polystyrene standards as described herein. The oligomeric seed has an average diameter in the range of from 200 nm, more preferably from 400 nm, and most preferably from 600 nm, to 8000 nm, preferably to 5000 nm, more preferably to 1500 nm, and most preferably to 1000 nm, as determined by disc centrifuge photosedimentometry (DCP), as described herein. The oligomeric seed contains a structural unit of a chain transfer agent such as an alkyl mercaptan, examples of which include n-dodecyl mercaptan, 1-hexanethiol, 1-octane thiol, and 2-butyl mercaptan.

The oligomeric seed is advantageously contacted with a first monoethylenically unsaturated nonionic monomer in the presence of a hydrophobic initiator, in any order, to transport the initiator into the seed, or seed swollen with monomer. As used herein, a hydrophobic initiator refers to an initiator having a water solubility in the range of from 5 ppm, preferably from 10 ppm, to 10,000, preferably to 1000, and more preferably to 100 ppm. Examples of suitable hydrophobic initiators include such as t-amyl peroxy-2-ethylhexanoate (water solubility=17.6 mg/L at 20° C.) or t-butyl peroxy-2-ethylhexanoate (water solubility=46 mg/L at 20° C.). The extent of swelling (seed growth) can be controlled by the ratio of the monomer to the seed.

Forming microspheres from oligomeric seed provides an effective way of controlling the particle size distribution of the microspheres. Preferably, the coefficient of variation of the first and the second microspheres, as determined by DCP, is less than 25%, more preferably less than 20%, more preferably less than 15%, and most preferably less than 10%. Preferably, the concentration of gel formed in the process of preparing the aqueous dispersion of second microspheres is preferably less than 0.5, more preferably less than 0.2, more preferably less than 0.1, and most preferably less 0.05 weight percent, based on the weight of the aqueous dispersion. Dispersions of microspheres with low coefficients of variation ultimately result in coatings with reliable and reproducible properties in end-use applications. In contrast, microspheres with coefficients of variation greater than 30% give coatings with unreliable and unpredictable properties. From the standpoint of quality control, it is advantageous to have coefficients of variation less achieved by the dispersions of the present invention. It is also advantageous to prepare dispersions of microspheres with low gel formation to reduce time lost to filtration and wastage of product.

Preferably, the particle size of the first microspheres is in the range of from 2.5 µm, more preferably from 3.0 µm, preferably to 12 µm, more preferably to 10 µm.

In a preferred process of the present invention, the aqueous dispersion of first microspheres is contacted under polymerization conditions and in the presence of 1) an emulsifying surfactant, such as a phosphate or an alkyl benzene sulfonate or sulfate; and 2) from 0.05, preferably from 0.1, and more preferably from 0.2 weight percent, to 5, preferably to 3, more preferably to 2, and most preferably to 1 weight percent of the nonionic polyalkylene oxide or anionic polyalkylene oxide salt of a distyryl or tristyryl phenol; and a first stage monomer comprising 3) from 80, preferably from 90 to 100, more preferably to 98 weight percent of a second monoethylenically unsaturated nonionic monomer based on the weight of the first stage monomer. The first microspheres increase in volume (grow out) to form an aqueous dispersion of second microspheres having a particle size in the range of from 1.1 µm, and preferably from 2.5 µm, preferably from 3.5 µm, to 25 µm, more preferably to 20 µm, and most preferably to 15 µm.

The first stage monomer preferably further comprises a multiethylenically unsaturated nonionic monomer, preferably at a concentration in the range of from 0.1, more preferably from 1, and most preferably from 2 weight percent, to 15, more preferably to 10, and most preferably to 8 weight percent, based the weight of first stage monomers. Examples of suitable multiethylenically unsaturated nonionic monomers include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The inclusion of these multiethylenically unsaturated nonionic monomers is particularly preferred where further staging of the second microspheres is desired.

The second microspheres preferably comprise a substantial absence of structural units of a carboxylic acid monomer.

The second microspheres preferably comprise from 90 to 98 weight percent structural units of a second monoethylenically unsaturated nonionic monomer, which may be the same as or different from the first monoethylenically unsaturated nonionic monomer. It is understood that "monomer" refers to one or more monomers.

It is preferred that the aqueous dispersion of first microspheres is contacted under polymerization conditions with the salt of the compound of Formula II or an excess of the salt of the compound of Formula III, so that the resultant dispersion of second microspheres preferably comprises the salt of the compound of Formula II or the salt of unreacted compound of Formula III. The presence of the salt of the compound of Formula II or III is especially advantageous if further staging of the second microspheres is desired. For example, it may be desirable to prepare a dispersion of second microspheres with a $T_g$ of less than 25° C., as calculated by the Fox equation, then further stage the second microspheres with the salt of the compound of Formula II or III and additional monoethylenically unsaturated nonionic monomer (second stage monoethylenically unsaturated nonionic monomer), which may be the same as of different from first stage monoethylenically unsaturated nonionic monomer, under polymerization conditions to yield a dispersion of third microspheres with a domain having a $T_g$ of less than 25° C., and a domain with a $T_g$ of greater than 50° C. The domains may form, for example, a core-shell morphology or a so-called "chocolate chip cookie" morphology. A water-soluble initiator/redox couple such as t-butyl hydroperoxide and isoascorbic acid (t-BHP/IAA) is advantageously used to form a gradient core-shell morphology.

Preferably, the polymerization step to prepare the aqueous dispersion of third microspheres is carried out at a pH of from at least 3, more preferably from at least 4, more preferably from at least 5, and most preferably from at least 6, to preferably 12, more preferably to 10 and most preferably to 8.

Additional compound of Formula I, particularly the salt of the compound of Formula I, may be added in the further staging of the second microspheres, preferably in the desired pH range where initiator/coupler is used.

In a second aspect, the present invention is a composition comprising an aqueous dispersion of polymeric microspheres and from 0.01, preferably from 0.05, more preferably from 0.1, and most preferably from 0.2 weight percent, to 5, preferably to 3, more preferably to 2, and most preferably to 1 weight percent, based on the weight of the microspheres, of a nonionic polyalkylene oxide of a distyryl or tristyryl phenol or an anionic polyalkylene oxide salt of a distyryl or tristyryl phenol, preferably the compound of Formula I or a salt thereof; or a composition comprising an aqueous dispersion of polymeric microspheres functionalized with from 0.01, preferably from 0.05, more preferably from 0.1, and most preferably from 0.2 weight percent, to 5, preferably to 3, more preferably to 2, and most preferably to 1 weight percent, based on the weight of the microspheres, of a nonionic polyalkylene oxide of a distyryl or tristyryl phenol or an anionic polyalkylene oxide salt of a distyryl or tristyryl phenol, preferably the compound of Formula I or a salt thereof;

wherein the polymeric microspheres have a solids content in the range of from 10, preferably from 20, more preferably from 25, and most preferably to 30 weight percent, to 60, more preferably to 50, and most preferably to 45 weight percent, based on the weight of the microspheres and water; wherein the polymeric microspheres have a particle size in the range of from 1 µm to 25 µm and a coefficient of variation of less than 25%, preferably less than 15%, and more preferably less than 10%; and wherein the dispersion comprises less than 1, preferably less than 0.5, more preferably less than 0.2, more preferably less than 0.1, and most preferably less than 0.05 weight percent gel, based on the weight of the composition, calculated as described in the Examples section.

The aqueous dispersion of microspheres is useful in coatings applications, especially where a matte finish is desired. Examples of such applications include leather, plastic packaging, wood, architectural coatings, and industrial coatings. The aqueous dispersion of microspheres may optionally include one or more additional components such as binders, thickeners, pigments, biocides, solvents, dispersants, and extenders.

It has been discovered that an aqueous dispersion of microspheres can be prepared with a low coefficient of variation and with low gel formation. It has further been discovered that such microspheres advantageously comprise a substantial absence of adsorbing latex particles having a particle size in the range of from 20 nm to 500 nm, more particularly, a substantial absence of adsorbing latex particles functionalized with cellulose. As used herein, "substantial absence" refers to less than 0.3, preferably less than 0.1, more preferably less than 0.05, and most preferably 0 weight percent of the latex particles adsorbed to the microspheres, based on the weight of the microspheres.

EXAMPLES

Molecular Weight Determination of Acrylic Oligomer Seed

The dispersion of acrylic oligomer seed (0.1 g) were dissolved in tetrahydrofuran (THF, 8 g, HPLC grade) then filtered through 0.45 µm PTFE filters. Gel Permeation Chromatography (GPC) separations were carried out on a liquid chromatograph equipped with an Agilent 1100 Model isocratic pump, a vacuum degasser, a variable injection size autosampler, and an Agilent 1100 HPLC G1362A Refractive Index detector. The data was processed with Agilent ChemStation, version B.04.03 and Agilent GPC-Addon version B.01.01. GPC separations were carried out using THF as an eluent at a flow rate of 1 mL/min using a GPC column set composed of two PLgel Mixed D columns (300×7.5 mm ID, 5 µm) and a guard column (50×7.5 mm ID, 5 µm). Ten polystyrene standards were fitted with a 1st order fit calibration curve. The weight average molecular weights ($M_w$) of the standards were as follows: 630; 1,370; 2,930; 4,900; 10,190; 22,210; 50,550; 111,400; 214,700; and 363,600. Data was collected using a refractive index (RI) detector.

DCP Particle Sizing Methods for Acrylic Oligomer Seed and Microspheres

Particle sizes and distribution were measured using Disc Centrifuge Photosedimentometer (DCP, CPS Instruments, Inc., Prairieville, La.) that separates modes by centrifugation and sedimentation through a sucrose gradient. The samples were prepared by adding 1 to 2 drops of the oligomer seed dispersion into 10 mL of deionized (DI) water containing 0.1% sodium lauryl sulfate, followed by injection of 0.1 mL of the sample into a spinning disc filled with 15 g/mL of sucrose gradient. For the oligomer seed, a 0-4% sucrose gradient disc spinning at 10,000 rpm was used, and a 596-nm polystyrene calibration standard was injected prior to injection of the sample. For the microspheres, a 2-8% sucrose gradient disc spinning at 3,000 rpm was used, and 9-µm polystyrene calibration standard was injected prior to injection of the sample. Median weight average ($D_{50}$) particle size and coefficient of variation (CV) were calculated using instrument's algorithm.

Method for Measuring Gel Formation

Pre-weighted sample (200 to 4,000 g) were poured through 20/100/325-mesh stacked screens (in decreasing pore size from top to bottom); each screen was washed with copious amounts of water and gel was collected separately and dried at 150° C. for 30 min. The gel data is calculated as the weight ratio of the collected total dry gel in each screen over the total sample size:

gel %=dry gel/total sample×100; gel ppm=dry gel/total sample×10⁶.

Example 1—Preparation of an Aqueous Dispersion of Acrylic Beads

An aqueous dispersion of acrylic oligomer seed (33% solids, 67 butyl acrylate/18 n-dodecyl mercaptan/14.8 methyl methacrylate/0.2 methacrylic acid) with a weight average median particle size ($D_{50}$) of 885 nm and a coefficient of variation of 5%, as determined by DCP, and a weight average molecular weight of 2532 g/mole was prepared substantially as described in U.S. Pat. No. 8,686,096, Examples 1 and 5 (col. 19 and 20). This acrylic seed was used to prepare the microspheres of all the Examples and Comparative Examples described herein.

Initiator emulsion was prepared by combining in a separate vial deionized water (4.9 g), Rhodacal DS-4 branched alkylbenzene sulfonate (DS-4, 0.21 g, 22.5% aq. solution), 4-hydroxy 2,2,6,6-tetramethylpiperidine (4-hydroxy TEMPO, 0.4 g), t-amyl peroxy-2-ethylhexanoate (TAPEH, 5.42 g, 98% active), then emulsified for 10 min with a homogenizer at 15,000 rpm. The initiator emulsion was then added to the dispersion of the acrylic seed (4.2 g, 32% solids) in a separate vial and mixed for 60 min. Deionized water (109.5 g), Solvay Soprophor 4D/384 ammonium salt of polyarylphenyl ether sulphate (4D/384, 5.25 g, 25% active), DS-4 (4.13 g, 22.5% solution), 4-hydroxy TEMPO (0.2 g), n-butyl acrylate (BA, 252.7 g), and allyl methacrylate (ALMA, 10.5 g) were combined in a first flask (shot ME). In a separate flask deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and shot ME was fed into the reactor over 15 min. After an induction period of 30 min, the resultant exotherm caused the reactor temperature to rise to 80° C. The particle size of the microspheres formed in this step as measured by DCP was 4.8 µm.

A first monomer emulsion (ME1, prepared by combining deionized water (328.5 g), 4D/384 (15.75 g, 25% active), DS-4 (12.38 g, 22.5% solution), 4-hydroxy TEMPO (0.6 g of), BA (758.3 g), and ALMA (31.6 g) was then fed into the reactor over 55 min. After a 20-min hold, NH₄OH (0.75 g, 28% aq.) was fed into the reactor over 3 min. The particle size of the microspheres formed in this step as measured by DCP was 8.0 μm.

The reactor temperature was cooled to and maintained at 75° C., after which time FeSO$_4$.7H$_2$O (11 g, 0.15% aq) and EDTA tetrasodium salt (2 g, 1% aqueous solution) were mixed and added to reactor. A second monomer emulsion (ME2) was prepared in a separate flask by combining deionized water (88 g), DS-4 (3.2 g, 22.5% solution), 4D/384 (5.25 g, 25% active), methyl methacrylate (MMA, 251 g), and ethyl acrylate (EA, 10.5 g). ME2, t-butylhydroperoxide (t-BHP, 1.44 g (70% aq.) in 100 g water) and isoascorbic acid (IAA, 1.05 g in 100 g water) were fed into the reactor over 45 min. The residual monomers were then chased by feeding t-BHP solution (2.54 g (70% aq.) in 40 g water) and IAA (1.28 g in 40 g water) into the reactor over 20 min. The consequent dispersion was filtered through a 45-μm screen; coagulum that remained on the screen was collected and dried (178 ppm). The filtrate was analyzed for percent solids (33.7%), coefficient of variation (8.4%), and particle size (8.1 μm, as measured by DCP).

Example 2—Preparation of an Aqueous Dispersion of Acrylic Beads with E-Sperse RS-1684 Reactive Surfactant The process of was carried out essentially as described for Example 1 except that E-Sperse RS-1684 Reactive Surfactant (RS-1684) was used in place of 4D/384 in shot ME (RS-1684, 13.12 g, 30% active), ME1 (RS-1684, 4.38 g, 30% active) and ME2 (RS-1684, 4.4 g, 30% active). The particle size of the microspheres was 4.7 μm following the shot ME polymerization step, 7.9 μm following the ME1 polymerization step, and 8.2 μm following the ME2 polymerization step, as measured by DCP. The percent solids was 32.7%, the coefficient of variation of the microspheres formed at the end of ME2 was 8.8%, and gel formation was 50 ppm.

Comparative Example 1—Preparation of an Aqueous Dispersion of Acrylic Beads without Distyryl or Tristyryl Phenol Surfactant The shot monomer emulsion was prepared in a separate flask by combining deionized water (109.5 g), DS-4 (4.13 g, 22.5% solution), BA (251.5 g), and ALMA (10.5 g). Deionized water (1575 g) was added to a 5-L round bottom flask (reactor) fitted with a stirrer, condenser, and a temperature probe. The reactor was heated to 70° C., after which time the acrylic oligomer seed mixture was added to the reactor followed by addition of ME1 over 15 min. After a 30-min hold, initiator emulsion—prepared by combining in a separate vial deionized water (4.9 g), DS-4 (0.21 g, 22.5% aq. solution), 4-hydroxy TEMPO (0.4 g), TBPEH (5.54 g, 98% active), then emulsified for 10 min with a homogenizer at 15,000 rpm—was shot added. After an induction period of 30 min, the resultant exotherm caused the reactor temperature to rise to 80° C. The presence of a large quantity of fines and gel (particles in the range of 50 nm to 500 nm) resulted in unreliable determination of microsphere particle size.

A first monomer emulsion (ME1, prepared by combining deionized water (328.5 g), DS-4 (12.38 g, 22.5% solution), BA (754.5 g), and ALMA (31.5 g) was then fed into the reactor over 55 min. Again, the presence of a large quantity of fines and gel resulted in unreliable determination of microsphere particle size.

The reactor temperature was cooled to and maintained at 75° C., after which time FeSO$_4$.7H$_2$O (11 g, 0.15% aq) and ethylene diamine tetraacetic acid tetrasodium salt (EDTA tetrasodium salt, 2 g, 1% aqueous solution) were mixed and added to reactor. A second monomer emulsion (ME2) was prepared in a separate flask by combining deionized water (90 g), DS-4 (3.2 g, 22.5% solution), MMA (252 g), and EA (10.9 g). ME2, t-BHP (1.44 g (70% aq.) in 100 g water) and IAA (1.05 g in 100 water) were fed into the reactor over 45 min. The residual monomers were then chased by feeding t-BHP solution (2.54 g, (70% aq.) in 40 g water) and IAA (1.28 g in 40 g water) into the reactor over 20 min. The consequent dispersion was filtered through a 45-μm screen; coagulum that remained on the screen was collected and dried (2.0%). The filtrate was analyzed for percent solids (32.2%), coefficient of variation (7.9%), and particle size (5.3 μm), as measured by DCP.

The presence of the 4D/384 or RS-1684 surfactant in the process for preparing microspheres resulted in the formation of 8-μm microspheres with a combination of both low gel formation and low coefficient of variation. In contrast, the process described comparative example, which contained no distyryl or tristyryl phenol, resulted in high gel formation.

The invention claimed is:

1. A composition comprising a) an aqueous dispersion of polymeric microspheres and from 0.01 to 5 weight percent, based on the weight of the microspheres, of a nonionic polyalkylene oxide of a distyryl or tristyryl phenol or an anionic polyalkylene oxide salt of a distyryl or tristyryl phenol represented by the compound of Formula I:

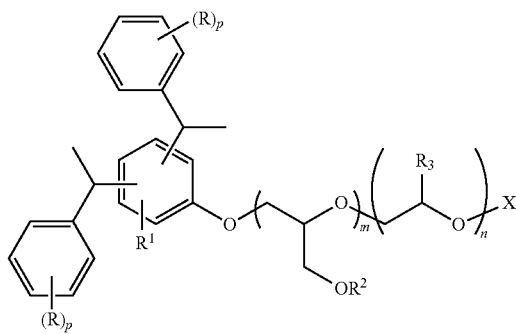

or b) an aqueous dispersion of polymeric microspheres functionalized with from 0.01 to 5 weight percent, based on the weight of the microspheres, structural units of the compound of Formula I;
where each R is independently $C_1$-$C_4$-alkyl; $R^1$ is H, 1-phenethyl-(R)$_p$, CH$_2$—CR=CH$_2$, or CH=CHCH$_3$; each $R^2$ is independently H, allyl, methyl, acrylate, methacrylate, or —CH$_2$CHR$^3$OX; each $R^3$ is independently H, methyl, or ethyl; m is 0 to 5; n is 6 to 40; p is 0, 1 or 2; and O—X is hydroxyl, methoxyl, a sulfate or a phosphate;
wherein the polymeric microspheres have a solids content in the range of from 10 to 60 weight percent, based on the weight of the microspheres and water; wherein the polymeric microspheres have a particle size in the range of from 1 μm to 25 μm and a coefficient of variation of less than 25%; and wherein the dispersion comprises less than 1 weight percent gel, based on the weight of the composition.

2. The composition of claim 1 wherein the dispersion comprises less than 0.2 weight percent gel, based on the weight of the composition and the microspheres have a coefficient of variation of less than 15%.

3. The composition of claim 1 which comprises from 0.1 to 3 weight percent, based on the weight of the microspheres, of the compound of Formula I, which is represented by the compound of Formula II, Formula III, or Formula IV:

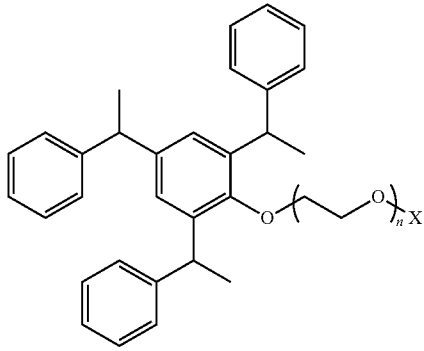

II where n is from 10 to 20, X is $-SO_3H$, $-SO_3Y$, $-H_2PO_3$, $-HPO_3Y$, or $-PO_3Y_2$, where Y is $Li^+$, $Na^+$, $K^+$, or $NH_4^+$; or

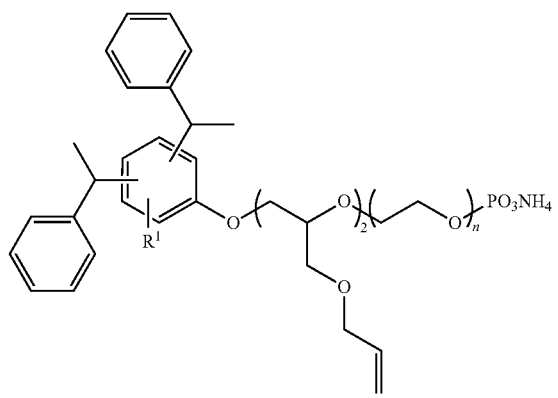

III where n is 12 and 18; or

IV

4. The composition of claim 3 which comprises from 0.2 to 2 weight percent, based on the weight of the microspheres, of the compound of Formula I, which is represented by the compound of Formula II, wherein the polymeric microspheres have solids content in the range of from 25 to 50 weight percent, based on the weight of the microspheres and water.

5. The composition of claim 3 which comprises from 0.2 to 2 weight percent, based on the weight of the microspheres, of the compound of Formula I, which is represented by the compound of Formula III, wherein the polymeric microspheres have solids content in the range of from 25 to 50 weight percent, based on the weight of the microspheres and water.

6. The composition of claim 3 which comprises from 0.2 to 2 weight percent, based on the weight of the microspheres, of the compound of Formula I, which is represented by the compound of Formula IV, wherein the polymeric microspheres have solids content in the range of from 25 to 50 weight percent, based on the weight of the microspheres and water.

* * * * *